May 6, 1930.  E. HEIBIG  1,757,364
DIALYZING APPARATUS
Filed June 13, 1928
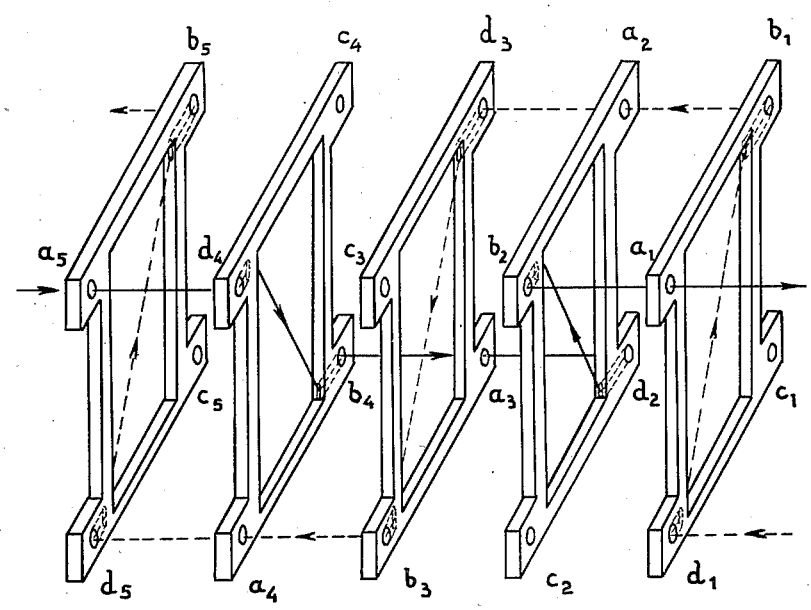
Inventor:
Edouard Heibig Patented May 6, 1930

1,757,364

UNITED STATES PATENT OFFICE

EDOUARD HEIBIG, OF PARIS, FRANCE

DIALYZING APPARATUS

Application filed June 13, 1928, Serial No. 285,168, and in the Netherlands February 2, 1927.

It has previously been proposed to regenerate caustic soda lyes which, in the treatment of cellulose and substances containing cellulose, have been contaminated by the absorption of organic substances. In this connection, the lyes resulting from the alkali cellulose used in the production of viscose are of particular importance.

The German Patent No. 287,092 describes a process for purifying such caustic soda lyes contaminated with substances in the colloidal state by subjecting the lye to dialysis with water or dilute pure alkali solution.

By the application of the counter-current principle, a pure lye can be ultimately obtained of a concentration approximating that of the original impure lye prior to the treatment. This process may be carried out by placing the caustic soda lye to be dialyzed in iron cells provided with walls of parchment paper and in contact with water. Suitable dialyzers are employed, care being taken to dispose a plurality of cells in series, so that the water used in one cell is led to the next. In its passage through the cells, the water takes up caustic soda lye, so that finally a caustic soda lye of approximately the same concentration as the original impure liquor is obtained. At the same time, the caustic soda lye to be purified must flow from cell to cell in the opposite direction to that taken by the water. On this account, it is necessary that the piping and cocks connecting the cells with the dialyzing diaphragms, and also those connecting the vessels enclosing the cells, should be connected up so that the two liquids travel on the counter-current principle.

Throughout the operation the fresh impure liquor must come in contact with water which has already traversed all the other cells and has become charged with alkali; whilst, conversely, the fresh water flows in contact with the impure lye past which all the other liquids charged with pure lye have previously traversed. Since the caustic soda lye rapidly absorbs carbon dioxide from the atmosphere, the process must be carried on in a closed vessel.

Although the said German patent describes the process, no device has yet been disclosed which would enable the process to be carried out without difficulty. Thus, it is stated in Hottenroth's book "Die Kunstseide" (1926 edition page 316) that this process cannot be carried out in practice because, in general, only comparatively small amounts of liquid can be dealt with by dialysis and there is excessive dilution. Moreover, the process would require cumbrous apparatus, and the slightest defect, such as very small holes in the diaphragm, would entirely nullify the useful effect, so that, for these reasons as well, the process is considered to be practically useless.

The present invention consists in apparatus for carrying out this process by which the above-mentioned drawbacks are removed, and in which no pipes or cocks are employed between the cells. The device according to the invention for dialyzing caustic soda lye and other liquids consists of a plurality of substantially similar frames with interposed diaphragms of parchment paper or other suitable material, the whole device being held together by pressure as in a filter press. Each frame forms a separate chamber, and the even-numbered and odd-numbered chambers are connected together to form two series. The liquid to be dialyzed, which traverses the one series of chambers, is admitted at one end of the device and the lixiviating liquid which flows through the other series of chambers is admitted at the other end.

If the device is to serve for dialyzing caustic soda lye, the frames should preferably be of cast iron.

According to the invention, each frame is extended at its four corners, the projections thus formed being designated by letters $a$, $b$, $c$, $d$, which are equipped with exponents 1, 2, 3, 4 and 5 indicating the ordinal numbers of the frames to which they belong. The said projections are provided with the following holes: at each corner of the $a$ group, there is a hole which has no connection with the chamber formed by the corresponding frame; at each of the corners $b^1$, $b^3$, $b^5$ there is a hole extending from the rear wall of the corresponding frame to the interior of the chamber formed by the frame, and at each corner $b^2$, $b^4$ there is a hole extending from the front wall of the corresponding frame to the interior of the chamber formed by the frame; at the corners of the $c$ group, no holes are needed, but, for reasons of symmetry, or to enable the frames to be turned round, holes similar to those at the corners of the $a$ group may be provided. At each of the corners $d^1$, $d^3$, $d^5$ there is a hole extending from the front wall of the corresponding frame to the interior of the chamber formed by the frame, and at each corner $d^2$, $d^4$ there is a hole extending from the rear wall of the corresponding frame to the interior of the chamber formed by the frame. The centres of the holes in the frame form the four corners of a rectangle. The projections of the $b$ and $d$ groups are not bored through in the transverse direction, but contain in each instance a passage connecting the chamber of the respective frame with the front or rear surface of the projection, one projection establishing communication with the one side and the other projection with the other side. The frames are all perfectly identical and the projections are bored in such a way that the axes of all the holes, whether they are carried right through or only part way, are in alignment. The frames are disposed so that in all cases a projection having a hole extending right through lies between two projections communicating with the chamber of the frame, so that continuous communication is established between the chamber of the first frame and the interior of the third frame, by means of a projection on the first frame, one on the second frame and one on the third frame. Each frame forms a closed chamber. If impure caustic soda lye is admitted into the first chamber through a projection at the base, this lye will pass out through the diagonally opposite projection at the top, then through the hole in the corresponding projection on the second frame, which does not communicate with the second chamber, and then reaches the projection on the third frame which communicates with the third chamber. The lye issues from the third chamber by way of the diagonally opposite bottom projection and passing by the fourth chamber, enters the bottom of the fifth chamber, flowing thereafter through all the odd-numbered chambers in the same manner. The water flows in a similar path but in the opposite direction through the even-numbered chambers. If the soda liquor in the third chamber flows obliquely downwards, the water in the fourth chamber flows in a cross direction, also obliquely, downwards; whereas in the second chamber it flows obliquely upwards in a direction crossing the current of liquor. The water issues from the apparatus in the most saturated condition attainable, through a bore passing through a projection on the first frame.

The projections may, of course, be replaced by strips of sufficient breadth, provided that the necessary symmetry is maintained. An example of an apparatus according to the invention is illustrated in an exploded perspective view in the single figure of the accompanying drawing.

The device consists of a number of identical frames 1, 2, 3, 4, etc., each of which forms or defines a chamber. Each frame is provided with four projections or lugs $a$, $b$, $c$, $d$, traversed completely or partially by holes, said reference letters having exponents applied to them indicating the ordinal numbers of the frames to which they belong. The axes of the holes at right angles to the frames are arranged symmetrically in relation to the chambers and form a rectangle which is perfectly identical in all the frames. The projections of the $a$ and $c$ groups are bored right through. The projections of the $b$ and $d$ groups are provided with holes, each of which commences at an outer surface of the frame and extends to the interior of the chamber, so that the projections of said $b$ and $d$ groups establish communication between the chamber and an outer surface of the frame; for example, $b^1$, $b^3$, $b^5$ and $d^2$, $d^4$, with the rear surface, and $d^1$, $d^3$, $d^5$, $b^2$, $b^4$ with the front surface. The frames are now assembled in such a manner that the projection $a'$ of frame 1 bears against the projection $b^2$ of frame 2; $b'$ of frame 1 bears against $a^2$ of frame 2; $c'$ against $d^2$ and $d'$ against $c^2$; there is no communication between $c'$ and $d^2$, or between $d'$ and $c^2$, though there is between $a'$ and $b^2$, and between $b'$ and $a^2$. Frame 3 is disposed so that $d^3$ bears against and communicates with $a^2$; $c^3$ bears against $b^2$ without forming a communication; $b^3$ bears against $c^2$ without forming a communication, whereas $a^3$ communicates with $d^2$. Frame 4 is disposed so that $b^4$ communicates with $a^3$; $c^4$ bears against $d^3$ without communication; $a^4$ communicates with $b^3$, and $d^4$ bears against $c^3$ without providing a communication. Frame 5 is disposed in the same way as frame 1, $a^5$ communicating with $d^4$; $b^5$ is not in communication with the adjacent projection $c^4$; $c^5$ is not in communication with $b^4$, and $d^5$ establishes communication with $a^4$.

The liquor to be purified follows the path: $d'$ (chamber 1), $b'$, $a^2$, $d^3$ (chamber 3), $b^3$, $a^4$, $d^5$ (chamber 5), $b^5$, etc. The water follows the path $a^5$, $d^4$ (chamber 4), $b^4$, $a^3$, $d^2$ (chamber 2), $b^2$, $a'$. It is thus evident that there is no need to bore the projections $c$.

All the frames are cast with a dovetail on both sides, to provide the chambers with continuous grooves for the insertion of rubber packing material, the parchment paper, or other diaphragm, being gripped between the rubber packings on each pair of adjacent frames. Packing of the requisite thickness must, of course, also be disposed between the adjacently situated through-bores in the projections. The frames are assembled in a framing and pressed together in a suitable press, as in filter presses, or in the osmotic apparatus for separating sugar from molasses.

The advantages of the device reside in its great simplicity and low prime cost; it also automatically by osmotic action regenerates the liquor resulting from the alkalization of cellulose in the production of viscose, has high capacity and requires but little supervision or attendance. The diaphragms of parchment paper must be renewed from time to time as they become less permeable, but there is no liability of their being torn in use. The strength and quality of the supplied and discharged liquors must be tested at intervals, the supply of fresh water being regulated accordingly. The counter-current principle is carried out preferably, since the currents of liquor and water always cross in each cell. The device may, of course, also be used for other liquids than caustic soda liquor.

What I claim is:—

1. A dialyzing unit, consisting of a multiplicity of alternating skeleton frames and permeable diaphragms conjointly providing a series of chambers, said frames being disposed face to face, with the chambers of alternate frames connected to form two separate series through which the liquid to be dialyzed and the dialyzing liquid are caused to circulate in counter-current; each odd-numbered frame being provided at two diagonally-opposite corners with a pair of internal passages, one leading into and the other from the interior of the respective chamber; and each even-numbered frame being provided at two diagonally-opposite corners, other than the two of the odd-numbered frames, with a pair of internal passages, one leading into and the other from the interior of the respective chamber; certain odd-numbered frames being provided at one of their remaining corners with a hole which establishes direct communication between adjacent passages of the even-numbered frames, and certain even-numbered frames having holes establishing similar communication between adjacent passages of the odd-numbered frames.

2. A dialyzing unit, according to claim 1, in which each frame in the unit has projections at all four corners wherein the passages and holes are formed, the several frames being of counterpart size and shape, with their passages and holes arranged symmetrically throughout the entire set.

In testimony whereof I affix my signature.

EDOUARD HEIBIG.